E. J. SCARSETH.
COMPOUND TOOL.
APPLICATION FILED MAY 15, 1917.
1,324,323.
Patented Dec. 9, 1919.
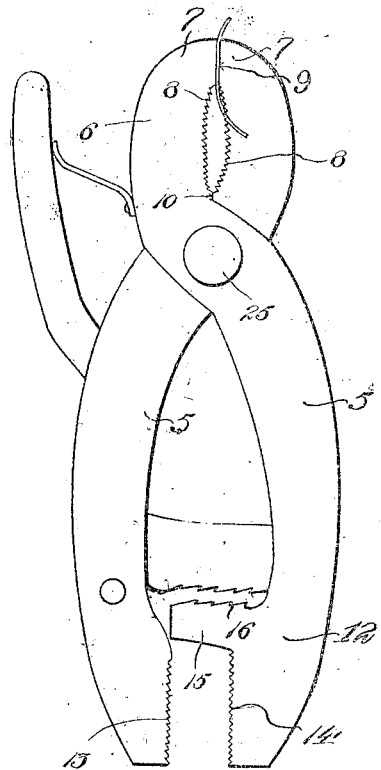
Fig. 1.
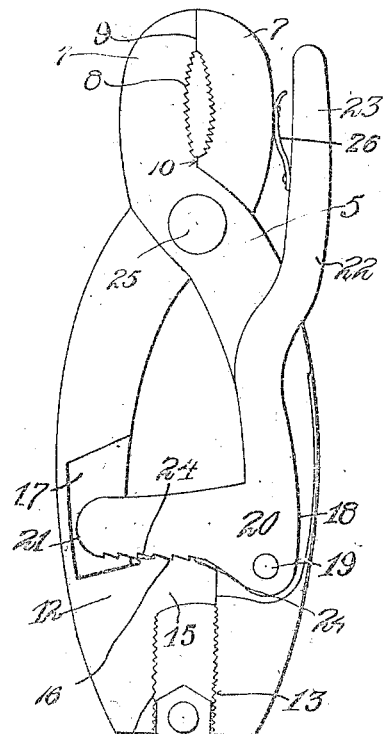
Fig. 2.
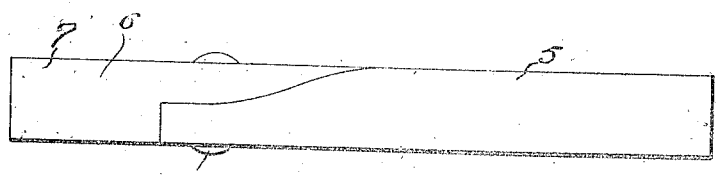
Fig. 3.
Witness
E. J. Higgins.
P. H. Pattison.
Inventor
E. J. Scarseth
By 
Attorney

UNITED STATES PATENT OFFICE.

EDWIN J. SCARSETH, OF GALESVILLE, WISCONSIN.

COMPOUND TOOL.

1,324,323.   Specification of Letters Patent.   Patented Dec. 9, 1919.

Application filed May 15, 1917. Serial No. 168,826.

*To all whom it may concern:*

Be it known that I, EDWIN J. SCARSETH, a citizen of the United States, residing at Galesville, in the county of Trempealeau, State of Wisconsin, have invented certain new and useful Improvements in Compound Tools; and I do hereby declare the following to be a full, clear, and exact description of the invention, such as will enable others skilled in the art to which it appertains to make and use the same.

This invention relates to new and useful improvements in compound tools, and has for its primary object to provide a combination pliers and monkey wrench.

Referring to the drawings,

Figure 1 is a view of the device showing its use as a pair of pliers,

Fig. 2 is a view of the device showing its use as a monkey wrench, and,

Fig. 3 is an edge view of the device.

Referring more particularly to the drawings, the device comprises crossed handle levers 5 whose front ends are curved as at 6 to provide opposite jaws 7 which are provided with roughened gripping faces 8 and smooth gripping faces 9. The inner ends of the jaw faces terminate in cutters 10 which serve as wire cutting elements when the jaws are moved to their closed position. The opposite end of each of the handles is enlarged as at 12, one of said handles being substantially flat as at 13 to provide a jaw face, the other of said handles being provided with a jaw face 14 and a projection 15 which is adapted to engage the jaw face 13 to limit the inward movement of the plier handles. This extension 15 is provided on its inner edge with a rack 16, and this handle is recessed or cut out as at 17 for a purpose to be hereinafter described.

The opposite handle is cut out as at 18, and pivoted as at 19 in said cut-out portion 18 is a right-angular or L-shaped lever 20 having long and short arms. The free end of the short arm 21 thereof is adapted to lie in the recess 17 of the opposite handle when the handles are in the closed position. The long arm 22 of the right-angular lever 20 is enlarged as at 23 to provide an operating handle, by means of which the right-angular lever 20 is moved about its pivot 19. The edge of the arm 21 is provided with a rack 24 which is adapted to engage with the rack 16 of the opposite handle member to retain the handles in their adjusted position.

A spring 26 may be carried by the long arm 22 and act against the adjacent jaw to hold the short arm away from the toothed projection 15 (see Fig. 2); or the spring may be attached to the member 7 (see Fig. 1).

When the device is used as a pair of pliers, the right-angular lever 20 is rocked on its pivot so that its rack 24 disengages the rack 16, thus permitting the handle levers 5 to operate about their pivot 25 to open and close the jaws of the pliers. When the device is used as a wrench, the jaws 13 and 14 are engaged with the article to be operated upon, and the handle levers 5 are then held and the right-angular lever 20 is rocked about its pivot 19 until its rack teeth 24 engage the rack teeth 16 of the extension 15, and if the plier jaws together with the operating handle 23 of the right-angular lever 20 be gripped, it is apparent that the jaws 13 and 14 of the wrench will be maintained in engagement with the article operated upon by the said wrench.

From the foregoing it will be seen that the present invention provides a combination tool which may be used as a pair of pliers, a wire cutter, or a monkey wrench, thus providing one tool for the operations which ordinarily require two tools to perform.

Having thus described the invention, what is claimed, is:

1. A tool of the character described comprising a pair of crossed members pivotally connected and forming jaws at one end and handles and opposite coacting faces at the other end, one handle having a projection extending toward the other handle and provided with teeth on that face next the pivot, the teeth facing away from said other handle, an L-shaped lever pivoted at its angle to said other handle and having teeth on one arm to engage the teeth on said projection, the other arm being extended beyond the pivotal connection of said handles, and a spring carried by this arm and acting upon the back of one of the jaws to hold said teeth normally disengaged.

2. A tool of the character described comprising a pair of crossed members pivotally connected and forming jaws at one end and handles and jaw faces at the other end, one handle being notched, a toothed projection adjacent the notch and extending toward the other handle, an L-shaped lever pivoted to said other handle and having long and short arms, teeth on the short arm to engage the toothed projection, the long arm being extended exteriorly of the members beyond the pivotal connection thereof, and means carried by the long arm and acting upon one of the members adjacent thereto to normally hold the short arm in a position whereby its teeth will be out of engagement with the toothed projection, the notch forming clearance for the short arm on the closing of the handles.

In testimony whereof, I affix my signature in the presence of two witnesses.

EDWIN J. SCARSETH.

Witnesses:
R. H. ASHLEY,
J. A. HAMMER.